Oct. 25, 1949.                    L. L. TURNER                    2,485,941
                                  ANIMAL TRAP
Filed Oct. 8, 1946                                           3 Sheets-Sheet 1
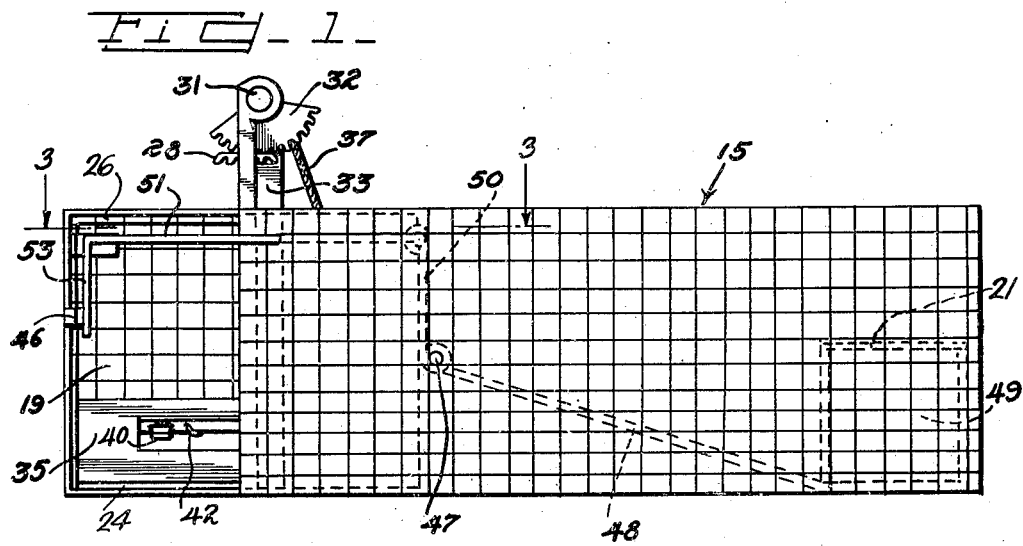
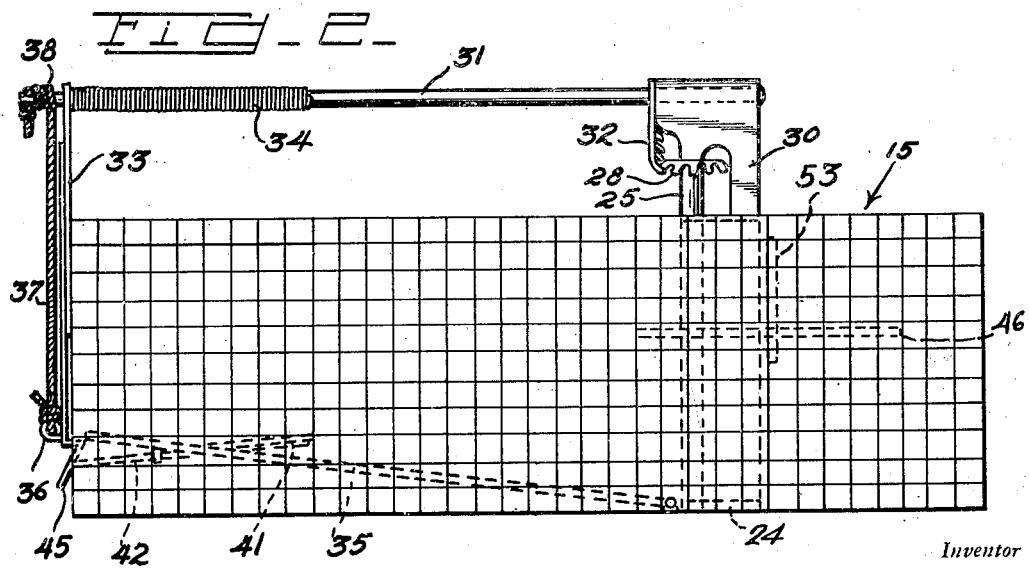
Inventor
*Lowry L. Turner —*
By *Clarence A. O'Brien
and Harvey B. Jacobson*
                                                              Attorneys Oct. 25, 1949.     L. L. TURNER     2,485,941
ANIMAL TRAP
Filed Oct. 8, 1946     3 Sheets-Sheet 2
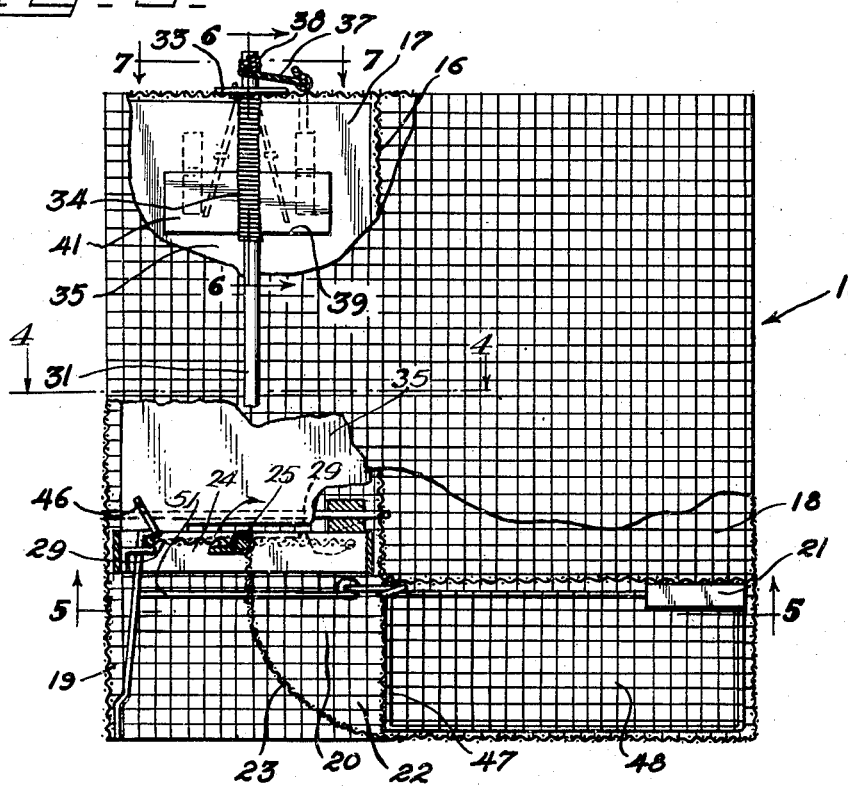
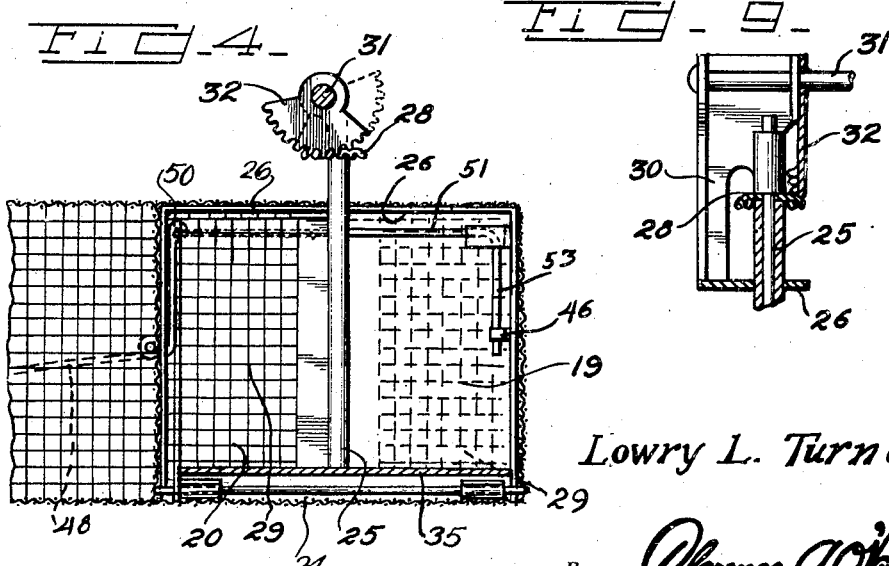
Inventor
Lowry L. Turner

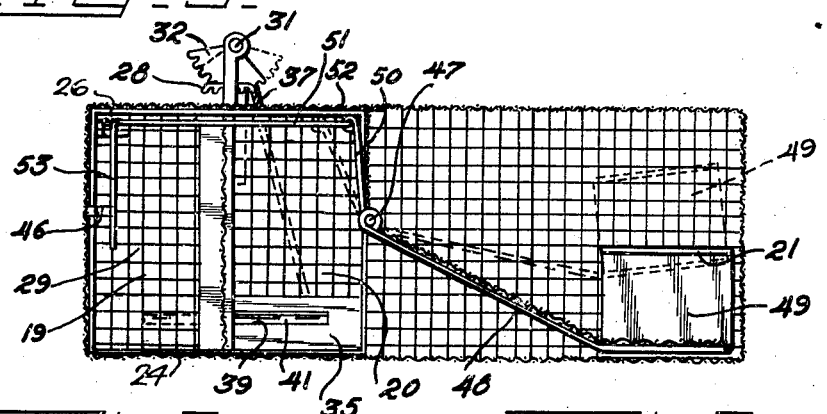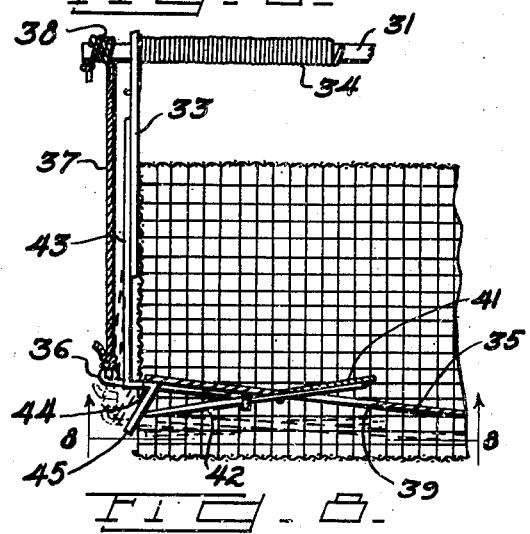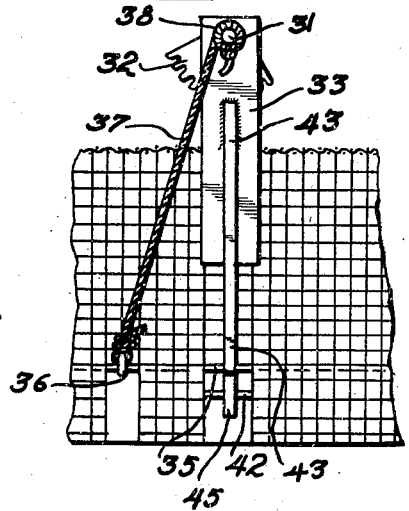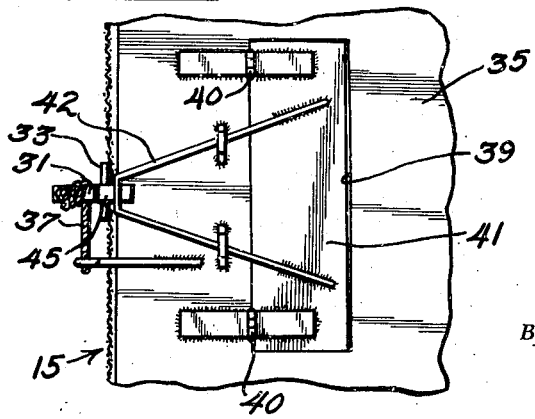

Patented Oct. 25, 1949

2,485,941

UNITED STATES PATENT OFFICE 2,485,941

ANIMAL TRAP

Lowry L. Turner, Denmark, S. C.

Application October 8, 1946, Serial No. 701,947

6 Claims. (Cl. 43—64)

1

This invention relates to an animal trap and more particularly to a trap for rodents and the like.

The primary object of the invention is to entice an animal such as a rat into a closed compartment from which he cannot escape.

The above and other objects may be attained by employing this invention which embodies among its features a platform pivotally supported at one end to swing about a horizontal axis under the influence of the weight of an animal to be trapped, a gate pivotally supported to swing about a vertical axis located adjacent the pivotal support of the platform, means yieldingly to hold the gate parallel with an adjacent pivoted edge of the platform, means operable upon the depression of the platform to swing the gate to a position one hundred eighty degrees from its initial position and means automatically to latch the gate after it has been so swung.

Other features include a rectangular closed compartment having an entrance and an exit adjacent the entrance, a depressible platform in the compartment pivotally supported adjacent the entrance and exit to swing about a horizontal axis, a door pivotally supported to swing about a vertical axis between the entrance and the exit, means yieldingly to hold the door in a closed position with relation to the exit, means actuated upon the depression of the platform to swing the door to a position to close the entrance and open the exit, a second closed compartment adjacent the first mentioned closed compartment, said second compartment having an entrance, a closed passageway establishing communication between the exit of the first mentioned closed compartment and the entrance of the second mentioned closed compartment and means in the passageway adapted to be actuated by the passage of an animal therethrough to release the latch and permit the door to return to exit closing position.

In the drawings:

Figure 1 is an end view of a trap embodying the features of this invention.

Figure 2 is a side view thereof.

Figure 3 is a top plan view of the trap, portions of the wall being broken away substantially on the line 3—3 of Figure 1 more clearly to illustrate certain details of construction.

Figure 4 is a transverse sectional view through a fragment of the trap.

Figure 5 is a transverse sectional view taken substantially along the line 5—5 of Figure 3.

Figure 6 is a sectional view taken substantially along the line 6—6 of Figure 3.

2

Figure 7 is a fragmentary end view taken in a plane along the line 7—7 of Figure 3 and looking in the direction of the arrows.

Figure 8 is a horizontal sectional view taken substantially along the line 8—8 of Figure 6, and Figure 9 is an enlarged sectional view taken substantially along the line 9—9 of Figure 3.

Referring to the drawings in detail this improved trap comprises a substantially rectangular closed body designated generally 15 composed of screen wire such as that commonly called hardware cloth. The hollow body is divided by a partition wall 16 into what may be conveniently referred to as an entrance compartment 17 and a confining compartment 18. The entrance compartment is provided at one end with an entrance 19 and an adjacent exit 20, and leading from the exit 20 to an entrance 21 formed in an adjacent wall of the compartment 18 is a passageway 22. The outer side wall of the passageway 22 curves inwardly as at 23 to form a partition which separates the entrance 19 from the exit 20 as will be readily understood upon reference to Figure 3.

Extending transversely between the side wall of the compartment 17 and the partition wall 16 adjacent the bottom of the compartment is a supporting strip 24 which is provided midway between its ends with an opening for the reception of the lower end of a vertically extending rotary shaft 25, the upper end of which is rotatably supported in a cross member 26 which extends transversely of the compartment 17 immediately above the strip 24. Secured to the upper end of the shaft 25 is a pinion 28, and carried by the shaft 25 in a position to close the entrance and exit 19 and 20 respectively is a door 29 which when in one position will close the exit 20 and when swung through an arc of one hundred eighty degrees will close the entrance 19.

Supported on a vertically extending bracket 30 carried by the cross member 26 adjacent the upper end of the shaft 25 is a horizontally disposed shaft 31 carrying a segmental gear 32 adjacent one end for meshing engagement with the pinion 28. The opposite end of the shaft is journaled in a standard 33 carried by the end wall of the compartment 17 opposite the entrance and exit. A coil spring 34 surrounds the shaft adjacent the standard 33, and one end of said spring is anchored in the standard, while the other end is anchored in the shaft 31 so that when the shaft is rotated the spring will serve to return it to its initial position.

Pivotally supported adjacent the entrance and exit of the compartment 17, and extending throughout the full width of the compartment is a platform 35 carrying at its free end an eye 36 to which one end of a flexible member 37 is secured while the opposite end is wound about the shaft 31 as at 38 and anchored thereto so that when the platform 35 moves downwardly the shaft 31 will be rotated. It will thus be seen that when the platform swings downwardly about its pivoted end the gate 29 will be moved from a position closing the exit 20, to a position closing the entrance 19 against the effort of the spring 34. Formed in the platform 35 near its free end is a transversely extending opening 39, and hinged as at 40 (Figure 8) to the underside of the platform adjacent the edge of the opening 39 nearest the free end of the platform is a trap door 41 carrying on its underside a substantially V-shaped tongue 42 which projects slightly beyond the free end of the platform 35 to hold the trap door in a slightly open position as will be readily understood upon reference to Figure 6. Secured to the standard 33 and extending downwardly below the lower end thereof is a spring arm 43 formed at its lower end with an angular extension 44 which normally engages the free end of the platform 35 to hold it in elevated position. A cam member 45 projects downwardly from the free end of the angular extension 44 and is adapted to engage the outer end of the tongue 42, so that when pressure is applied to the trap door 41 the angular extension or ledge 44 will be moved out of engagement with the end of the platform to permit it to move downwardly under the influence of the weight of an animal thereon. It will thus be seen that a weight released latch is provided which normally holds the platform elevated, but which will automatically trip when the trap door 41 is moved downwardly and an animal release trigger mechanism by which the trap is actuated is provided.

In order to retain the trap door 29 in entrance closing position after the platform 35 has moved to lowered position I secure to the outer side wall of the compartment 17 adjacent the entrance 19 a latch tongue 46 which when the door swings to entrance closing position, due to the rotation of the shaft 31, will engage the free edge of the door and hold it against return movement under the influence of the spring 34. It will thus be seen that an animal entering the compartment 17 through the entrance 19 and approaching bait deposited on the free end of the platform 35 will encounter the trigger mechanism so that the platform may swing downwardly under the influence of the weight of the animal and in so doing will rotate the shaft 31 to cause the entrance to be closed by the door 29, and hence frustrate any attempt of the animal to escape through the entrance.

In its attempt to escape from the compartment 17 the animal will find its way through the exit into the passage 22, and in order to confine the animal therein and also to reset the trap for a repeat operation I pivotally mount as at 47 adjacent the entrance of the passage 22 a vertically movable grating 48 to the free end of which is attached a door 49 which normally closes the entrance 21 to the compartment 18, and the animal trapped in the passage 22 in its effort to escape therefrom will work its way beneath the grating 48, causing the free end thereof to move upwardly and open the door 49 so that it can escape into the compartment 18. Simultaneous with the movement of the grating 48 upwardly an arm 50 which is rigidly attached thereto and projects upwardly from a point adjacent its pivoted end will swing away from the wall 16 dividing the compartments 17 and 18 into the dotted line position as suggested in Figure 5. A push rod 51 is pivotally connected to the upper free end of the arm 50 as at 52, and is slidably mounted to move transversely of both the entrance and the exits 19 and 20, and formed at the free end of the push rod 51 is a depending angular extension 53 which is adapted to bear against the latch 46 in such a position that when the push rod is moved under the influence of the lever 50 the latch will be moved out of engagement with the edge of the door 29 so as to permit it to swing under the influence of the spring 34 into entrance opening, and exit closing position.

In use it will be understood that the trap is set by elevating the free end of the platform 35 under the influence of the spring 34 so that its free end is engaged by the horizontal extension at the lower end of the spring arm 43. This will cause the trap door 41 to open slightly as suggested in Figure 6, and the bait is placed on the platform adjacent its free end. An animal entering the trap through the entrance 19 will naturally traverse the platform toward the bait, and stepping on the trap 41 will operate the trigger mechanism to release the platform and permit it to lower under the influence of the weight of the animal. Such motion will exert pull on the flexible member 37 to cause it to rotate the shaft 31 against the influence of the spring 34 and through the medium of the segmental gear 32 and pinion 28 the door 29 will be thrown from exit closing, to entrance closing position and latched in such position by means of the latch 46. In endeavoring to escape from the compartment 17 the animal will find its way through the exit 20 into the passage 22 and encountering the grating 48 will cause the latter to swing about its pivot 47 to open the door 49 and simultaneously release the latch 46 to permit the door 29 to swing into exit closing and entrance opening position. Opening the door 49 the animal will find its way through the entrance 21 into the compartment 18 from which there is no escape and consequently will be confined until manually released. It is obvious that the top of the compartment 18 may be made in a separate piece so that access may be had thereto to extract trapped animals therefrom.

While in the foregoing there has been shown and described the preferred embodiment of this invention it is to be understood that minor changes in the details of construction, combination and arrangement of parts may be resorted to without departing from the spirit and scope of the invention as claimed.

What I claim:

1. A trap which includes a platform pivotally supported at one end to swing about a horizontal axis under the weight of an animal to be trapped, a gate pivotally supported to swing about a vertical axis located adjacent the pivotal support of the platform midway between opposite side edges of said platform, means yieldingly to hold the gate parallel with an adjacent edge of the platform, means operable upon the depression of the platform under the weight of an animal to swing the gate to a position one hundred eighty degrees from its initial position and means automatically to latch the gate in its swung position.

2. A trap which includes a platform pivotally supported at one end to swing about a horizontal axis under the weight of an animal to be trapped, a gate pivotally supported to swing about a vertical axis located adjacent the pivotal support of the platform midway between opposite side edges of said platform, means yieldingly to hold the gate parallel with an adjacent edge of the platform, means operable upon the depression of the platform under the weight of an animal to swing the gate to a position one hundred eighty degrees from its initial position and means automatically to latch the gate in its swung position, and animal actuated means to release the latching means.

3. In a trap a substantially rectangular closed compartment having an entrance and an exit adjacent the entrance, a depressible platform in the compartment pivotally supported adjacent the entrance and exit to swing about a horizontal axis, a door pivotally supported to swing about a vertical axis between the entrance and the exit, means yieldingly to hold the door in a position to close the exit and means actuated upon the depression of the platform to swing the door into a position to close the entrance.

4. In a trap a substantially rectangular closed compartment having an entrance and an exit adjacent the entrance, a depressible platform in the compartment pivotally supported adjacent the entrance and exit to swing about a horizontal axis, a door pivotally supported to swing about a vertical axis between the entrance and the exit, means yieldingly to hold the door in a position to close the exit and means actuated upon the depression of the platform to swing the door into a position to close the entrance and a latch to hold the door in entrance closing position.

5. In a trap a substantially rectangular closed compartment having an entrance and an exit adjacent the entrance, a depressible platform in the compartment pivotally supported adjacent the entrance and exit to swing about a horizontal axis, a door pivotally supported to swing about a vertical axis between the entrance and the exit, means yieldingly to hold the door in a position to close the exit and means actuated upon the depression of the platform to swing the door into a position to close the entrance and a latch to hold the door in entrance closing position and animal actuated means to release the latch and allow the door to return to exit closing position.

6. In a trap a substantially rectangular closed compartment having an entrance and an exit adjacent the entrance, a depressible platform in the compartment pivotally supported adjacent the entrance and exit to swing about a horizontal axis, a door pivotally supported to swing about a vertical axis between the entrance and the exit, means yieldingly to hold the door in a position to close the exit and means actuated upon the depression of the platform to swing the door into a position to close the entrance and a latch to hold the door in entrance closing position, a second closed compartment adjacent the first mentioned closed compartment, said second compartment having an entrance, a closed passageway establishing communication between the exit of the first mentioned closed compartment and the entrance of the second mentioned closed compartment and means in the passageway adapted to be actuated by the passage of an animal therethrough to release the latch and permit the door to return to exit closing position.

LOWRY L. TURNER.

REFERENCES CITED

The following references are of record in the file of this patent:

UNITED STATES PATENTS

| Number | Name | Date |
| --- | --- | --- |
| 71,364 | Churchill | Nov. 26, 1867 |
| 681,791 | Huffman | Sept. 3, 1901 |